United States Patent Office 3,645,976
Patented Feb. 29, 1972

3,645,976
ELASTIC POLYURETHANE FIBERS
Isamu Suzuki, Kiyoshi Ichikawa, Yasuji Nakahara, and Kunico Kondo, Fuji-shi, Japan, assignors to Asahi Kasei Kogyo Kabushiki Kaisha, Osaka, Japan
No Drawing. Filed Oct. 29, 1969, Ser. No. 872,390
Claims priority, application Japan, Nov. 5, 1968, 43/80,831; May 21, 1969, 44/38,717
Int. Cl. C08g *22/04, 22/18*
U.S. Cl. 260—75NH                              4 Claims

ABSTRACT OF THE DISCLOSURE

In the segment polyurethane polymers consisting as the main components of bifunctional low polymeric compounds having terminal active hydrogen atoms, organic diisocyanates and diamines, elastic polyurethane fibers substantially comprising recurring units of the general formula

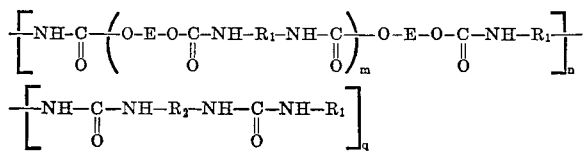

wherein E is a radical of bifunctional low polymeric compounds having terminal active hydrogen atoms; $R_1$ is a member selected from the group consisting of 4,4'-methylenebiscyclohexyl, 4,4'-isopropylidenebiscyclohexyl, 4,4'-oxybiscyclohexyl and 1,4-cyclohexylene radicals; $R_2$ is a member selected from the group consisting of 1,4-cyclohexylene radicals with or without methyl and ethyl groups on the ring; $m$ is from 0 to 2; and $n$ and $q$ are 1 or 2 respectively, and in which at least 50 percent by weight of $R_1$ has trans-trans conformation except the case where $R_1$ is 1,4-cyclohexylene in which at least 55 percent by weight has trans conformation and at least 33 percent by weight of $R_2$ has trans conformation.

BACKGROUND OF THE INVENTION

(1) Field of the invention

This invention is concerned with elastic polyurethane fibers which are capable of being bleached with chlorine and have excellent light resistance and gas fading resistance, and a process for preparing the same.

(2) Description of the prior art

Elastic polyurethane fibers heretofore known have a fatal defect in that, when bleached with chlorine, not only are they colored to a remarkable extent but also their elasticity is reduced, in some instances, to such a degree that they lose their function as an elastomer. It is a further disadvantage of the prior polyurethane fibers that their deterioration with light is so remarkable as lowering the value of the products due to coloring and strength reduction. In this respect, a number of patents have been issued to disclose that light stabilizers be added thereto. However, as these defects not only have resulted in decrease in life of the products but also have limited the fields where the products are used, further improvement is desired with respect to structure itself of the elastic polyurethane fibers.

A method of the improvement has been proposed in British Pat. No. 1,110,868 in which elastic polyurethane fibers produced using as the starting materials organic diisocyanate and diamine having 4,4'-alkylidenebiscyclohexyl groups which are described to be of high resistance to heat and light as well as to oxidation with a high degree of whiteness retained. However, whereas the elastic fibers of such a structure have extended duration in whiteness, they are not free from sacrifice in fundamental characteristics such as the softening point (low) and elasticity (poor).

SUMMARY OF THE INVENTION

It is an object of this invention to provide elastic polyurethane fibers in which disadvantages as mentioned above have been overcome, and which furthermore have improved resistance to chlorine bleaching, aging with light and gas fading, and the process for preparing the same. The object is accomplished by the elastic polyurethane fibers of the present invention which are produced by the combined use of special diisocyanates and diamines containing cyclohexane rings.

More particularly, the polyurethane fibers of this invention comprise a segment polyurethane polymer consisting as the main components of bifunctional low polymeric compounds having terminal active hydrogen atoms, organic isocyanates and diamines which are substantially composed of recurring units of the general formula

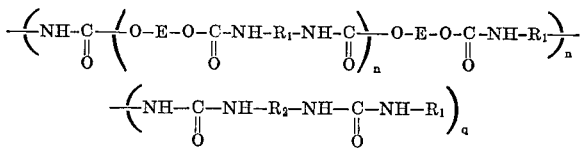

wherein E is a radical of bifunctional low polymeric compounds having terminal active hydrogen atoms; $R_1$ is a member selected from the group consisting of 4,4'-methylenebiscyclohexyl, 4,4' - isopropylidenecyclohexyl, 4,4'-oxybiscyclohexyl and 1,4-cyclohexylene radicals; $R_2$ is a member selected from the group consisting of 1,4-cyclohexylene radicals with or without methyl or ethyl groups on the ring; $m$ is from 0 to 2; and $n$ and $q$ are 1 or 2 respectively, and in which at least 50 percent by weight of $R_1$ has trans-trans conformation except the case where $R_1$ is 1,4-cyclohexylene in which at least 55 percent by weight has trans conformation and at least 33 percent by weight of $R_2$ has trans conformation.

According to this invention it is possible by using the special organic diisocyanates and diamines containing cyclohexane rings to produce elastic polyurethane fibers with remarkably improved resistance to light, chlorine bleaching and gas fading but without any sacrifice of mechanical and elastic properties. In other words, substitution of either of the isocyanate and the diamine used in this invention with other known components would not produce the effects comparable to those produced by the invention. This fact will be apparent by the examples given hereinbelow. It is surprising that the elastic fibers produced according to the invention have less tackiness and better filament separating property.

One component of the segment polyurethane polymer according to the present invention, the —O—E—O— constituents are derived from a bifunctional polymer containing terminal active hydrogens of the general formula HO—E—OH preferably with a molecular weight from 600 to 2,000. As examples of the polymer may be mentioned known polyesters, polyethers, polyesteramides, polyester urethanes, polyether urethanes and polyether esters containing terminal hydroxyl groups. A proper one is usually selected from these polymers but a mixed system of two or more polymers may be employed.

The organic isocyanates used in the invention are represented by the general formula OCN—$R_1$—NCO wherein $R_1$ has the same meaning as above and examples of the isocyanates are:

4,4'-methylenebiscyclohexylisocyanate,
4,4'-isopropylidenebiscyclohexyl isocyanate,
4,4'-oxybiscyclohexyl isocyanate,
1,4-cyclohexylenediisocyanate respectively alone and a proper combination of two or more of such isocyanates.

The diamines used in the invention are represented by the general formula $H_2N-R_2-NH_2$ wherein $R_2$ has the same meaning as above and preferred examples are 1,4-cyclohexylenediamine, 2-methyl-1,4-cyclohexylenediamine, 2,5-dimethyl-1,4-cyclohexylenediamine, 2,5-diethyl-1,4-cyclohexylenediamine and the like. The diamine may be used either alone or as a mixed system of two or more.

It is necessary to select the organic diisocyanate and the diamine as described above in such a manner that at least 50 percent by weight of $R_1$ in the recurring units has trans-trans conformation except the case where $R_1$ is 1,4-cyclohexylene in which at least 55 percent by weight has trans conformation, and at least 33% of $R_2$ has trans conformation. With polyurethanes in which less than 50 percent by weight of $R_1$ has trans-trans conformation (less than 55 percent by weight in the case where $R_1$ is 1,4-cyclohexylene), undesirably, the mechanical properties (especially modulus and tenacity) would become much worse and the resistance to chlorine bleaching would also be poorer. The same applies to polymers with $R_2$ having trans conformation of less than 33 percent by weight which is undesirably associated with sacrifice of the mechanical properties.

In accordance with the process of this invention, elastic fibers are easily obtainable, having a higher content of the trans conformation compared with the known fibers such as those described in the aforementioned British Pat. No. 1,110,868. This is one of the important factors essential for the high softening point and excellent elastic characteristics of the fibers.

In effecting the reaction of a bifunctional polymer containing terminal active hydrogen atoms, an organic diisocyanate and a diamine, the bifunctional polymer is usually reacted with an excessive molar amount of the organic diisocyanate to prepare an isocyanate terminated prepolymer and then a solution of the prepolymer dissolved in a suitable solvent is added with stirring to a solution containing an equimolar amount of the diamine at a temperature around the room temperature. Among the solvents suitable for the above-cited reaction are mentioned N,N-dimethylformamide, N,N-dimethylacetamide, N-methylpyrrolidone, N,N,N',N'-tetramethylurea, hexamethylphosphoramide, tetramethylenesulfone, dimethylsulfoxide and the like.

In carrying out the process of this invention it is effective, if desired, to incorporate into the reaction system a compound selected from the group (group A) consisting of > potassium isocyanate
> lithium chloride
> ammonium rhodanate and
> calcium nitrate and a compound selected from the group of compounds (group B) having the general formula:

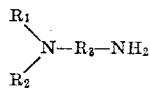

wherein $R_1$ and $R_2$ respectively are selected from lower alkyls such as methyl and ethyl and $R_3$ represents an alkylene group containing not more than 6 carbon atoms. Addition of the compounds of the groups A and B not only facilitates the preparation of a polyurethane solution being stable and having good spinnability but also enables therefrom production of elastic threads with excellent dyeability, color fastness and high moisture regain. The compound of the group A may be added at any stage of the above-cited reactions and preferably it is added previously to the isocyanate-containing prepolymer solution or the diamine solution. The compound of the group A is used usually in an amount of less than 10% of the resulting polyurethane and use of a greater amount will be undesirable from an economical point of view.

Preparable examples of a compound of the group B are dimethylaminoethylamine, dimethylaminopropylamine, diethylaminoethylamine, diethylaminopropylamine and the like. It is usually desirable to use the amine in admixture with the diamine component and the ratio of the former to the diamine is desirably less than 8 molar percent. Use of the amine in an amount of more than 8 molar percent will prevent formation of an elastic polyurethane polymer with a molecular high weight enough to exhibit satisfactory properties.

Polyurethane solutions without either of the compounds of the group A or B are sometimes unstable and generally tend to produce fibers poor in dyeability. Therefore, the invention requires the combined use of the compounds of the groups A and B to produce the desired effects.

From the polyurethane solutions produced according to this invention, fibers, films and the like can be produced by conventional means of molding. Coloring agents, stabilizers and other additives may be incorporated, if desired, prior to the molding.

DESCRIPTION OF PREFERRED EMBODIMENTS

The following examples will illustrate the invention in greater detail, and it is to be understood that the invention is not to be limited thereto but is to be construed broadly and restricted solely by the scope of the appended claims.

EXAMPLE 1

A mixture of 100 g. of polycaprolactone glycol with an average molecular weight of 1,250 and 37.1 g. of 4,4'-isopropylidenebiscyclohexyl isocyanate (content of the trans-trans isomer 81.5%) was subjected to reaction under nitrogen at 95° C. for 3 hours with stirring to give an isocyanate terminated prepolymer. To the prepolymer, after cooled to room temperature, were added 150 g. of dry dimethylacetamide to a homogeneous solution. The resulting prepolymer solution was added at room temperature to a stirred solution prepared separately from 5.47 g. of 1,4-cyclohexylenediamine (content of the trans isomer 63%) and 100 g. of dimethylacetamide. The viscous solution thus obtained was dry spun to give elastic fibers having the following excellent properties:

Softening point 195° C.; denier 78; tenacity 0.81 g./d.; elongation 760%; permanent set 4.3%; instant recovery 28.5%; wet heat setting 30.8%.

In addition, the elastic fibers were observed to exhibit less tackiness than that of the usual polyurethane elastic fibers.

In the above tests, permanent set is represented by percentage to the original length of the increase in length of the sample when maintained at 200% elongation for 30 min. under a relative humidity of 65% at 20° C. followed by being freed for 30 min.; instant recovery is measured in the similar manner when the sample is maintained at 200% elongation for one min. and successively at 100% elongation for 16 hours followed by being freed for 10 sec.; wet heat setting is also measured in the similar manner when the sample is kept in hot water at 80° C. for 40 min. at 100% elongation followed by being freed at room temperature.

Comparative Example 1

The same procedures as in Example 1 were repeated using 10.1 g. of 4,4'-methylenedicyclohexylamine in place of the 1,4-cyclohexylenediamine in the preceding example to obtain elastic fibers having the following properties:

Softening point 130° C.; denier 78; tenacity 0.53 g./d.; elongation 790%; permanent set 7.7%; instant recovery 80.3%; wet heat setting 91.5%.

These results clearly indicates that the use of 4,4'-alkylidenebiscyclohexylamine in place of the diamine in the present invention results in production of elastic fibers with remarkably poorer softening point, instant recovery as well as recovery in hot water.

EXAMPLE 2

The same procedures as in Example 1 were repeated using 6.81 g. of 2,5-dimethyl-1,4-cyclohexylenediamine (content of the trans isomer 80%) in place of 1,4-cyclohexylene diamine. Elastic fibers having the following properties were obtained.

Softening point 185° C.; denier 70; tenacity 0.73 g./d.; elongation 800%; permanent set 5.1%; instant recovery 25.9%; wet heat setting 33.2%.

EXAMPLE 3

An isocyanate terminated prepolymer was obtained in the same way as in Example 1 from 115.2 g. of polyoxytetramethylene glycol having an average molecular weight of 1,440 and 37.7 g. of 4,4'-methylenebiscyclohexyl isocyanate (content of the trans-trans isomer 85%). To the prepolymer were added at room temperature 200 g. of dry dimethylacetamide. The resulting prepolymer solution was added at room temperature to a stirred solution prepared from 7.2 g. of 1,4-cyclohexylenediamine (content of the trans isomer 63%), 0.25 g. of N,N-diethylaminopropylamine, 2.0 g. of potassium isocyanate and 150 g. of dimethylacetamide. The viscous solution thus produced was wet spun by the conventional means to give elastic fibers with the following excellent properties:

Softening point 195° C.; denier 145; tenacity 0.70 g./d.; elongation 730%; permanent set 3.9%; instant recovery 26.0%; wet heat setting 32.7%.

The elastic fibers thus obtained are deeply dyeable, for example, with an acid dye and excellent in color fastness.

For comparison's sake, a procedure was made without the use of N,N-diethylaminopropylamine and potassium isocyanate in Example 3 to observe somewhat lower stability of the polyurethane solution produced which was gradually gelled during a long period of storage time. Elastic polymers produced by wet spinning of the polyurethane solution prior to gelling could be deeply dyed but were much inferior in color fastness.

EXAMPLE 4

An isocyanate terminated prepolymer was produced from 100.0 g. of polyethylene adipate having an average molecular weight of 1,200 and 38.7 g. of 4,4'-isopropylidenebiscyclohexylisocyanate (content of the trans-trans isomer 90.5%). It was dissolved in 150 g. of dry dimethylacetamide. The prepolymer solution thus obtained was added with stirring at room temperature to a solution consisting of 5.4 g. of cyclohexylenediamine (content of the trans isomer 72%), 0.6 g. of N,N-diethylaminopropylamine, 1.4 g. of lithium chloride and 70 g. of dimethylacetamide. The resulting viscous solution was dry spun to obtain elastic fibers having the following properties:

Softening point 190° C.; denier 210; tenacity 0.80 g./d.; elongation 610%; permanent set 4.1%; instant recovery 25.5%; wet heat setting 35.2%.

EXAMPLE 5

The same procedures as in Example 4 were repeated using 2.5 g. of ammonium rhodanate in place of the lithium chloride to obtain elastic fibers with almost the same properties as those of the product in said example.

EXAMPLE 6

The same procedures as in Example 4 were repeated using 0.5 g. of dimethylaminoethylamine in place of the N,N-diethylaminopropylamine to obtain elastic fibers with almost the same properties as those of the product in said example.

EXAMPLE 7

The same procedures as in Example 1 were repeated using 21.2 g. of 1,4-cyclohexylenediisocyanate (content of the trans isomer 85.5%) in place of the 4,4'-isopropylidenebiscyclohexyl isocyanate to obtain elastic fibers with the following properties:

Softening point 185° C.; diener 280; tenacity 0.66 g./d.; elongation 800%; permanent set 4.8%; instant recovery 28.7%; wet heat set 30.5%.

The results of measurement on the resistance to light and chlorine bleaching of the elastic fibers produced in the preceding examples are summarized in Table 1 below. For comparison's sake, in addition to the above-described Comparative Example 1, elastic fibers were prepared using, in place of the isocyanate or the diamine of the present invention, the known component usually used in the art as follows:

Comparative Example 2

Using 4,4'-diphenylmethanediisocyanate in place of the isocyanate in Example 1.

Comparative Example 3

Using ethylenediamine in place of the diamine in Example 1.

Comparative Example 4

Using 4,4'-diphenylmethanediisocyanate and ethylenediamine respectively in place of the isocyanate and the diamine in Example 1.

TABLE 1

| | Resistance to light [1] | | Resistance to chlorine bleaching [2] | |
|---|---|---|---|---|
| | Residual strength (percent) | Color | Residual strength (percent) | Color |
| Example: | | | | |
| 1 | 90.4 | White | 95.6 | White. |
| 2 | 93.3 | do | 98.5 | Do. |
| 3 | 100.0 | do | 99.2 | Do. |
| 4 | 96.7 | do | 95.0 | Do. |
| 5 | 92.9 | do | 91.8 | Do. |
| 6 | 93.0 | do | 96.3 | Do. |
| 7 | 97.2 | do | 97.6 | Do. |
| Comparative Example: | | | | |
| 1 | 88.2 | do | 90.0 | Do. |
| 2 | 30.1 | Yellow | 41.5 | Orange. |
| 3 | 67.2 | Pale Yellow | 51.8 | Pale yellow. |
| 4 | 26.6 | Yellow | 36.9 | Orange. |

[1] Irradiated with a fade-O-meter for 15 hours.
[2] Dipped in 0.08% aqueous solution of NaClO₂ (pH 3.5, acetic acid) at 85° C. for 30 minutes.

We claim:

1. In the segment polyurethane polymers consisting of the main components of bifunctional low polymeric compounds having terminal active hydrogen atoms, organic diisocyanates and diamines, elastic polyurethane fibers substantially comprising recurring units of the general formula

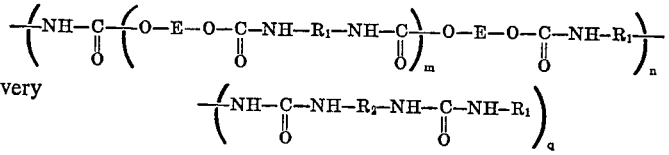

wherein E is a radical of a bifunctional low polymeric compound having terminal active hydrogen atoms and selected from the group consisting of a polyester, a polyether, a polyesteramide, a polyester urethane, a polyether urethane and a polyether ester; $R_1$ is a member selected from the group consisting of 4,4'-methylene-biscyclohexyl, 4,4' - isopropylidenebiscyclohexyl, 4,4' - oxybiscyclohexyl and 1,4-cyclohexylene radicals; $R_2$ is a member selected from the group consisting of 1,4-cyclohexylene radicals, methyl-substituted 1,4-cyclohexylene radicals and ethyl-substituted 1,4-cyclohexylene radicals; $m$ is 0, 1 or 2; and $n$ and $q$ are 1 or 2 respectively, and in which at least 50 percent by weight of $R_1$ has trans-trans conformation except the case where $R_1$ is 1,4-cyclohexylene in which at least 55 percent by weight has trans conformation and at least 33 percent by weight of $R_2$ has trans conformation.

2. Elastic polymers of claim 1 in which the radical E is the residue remaining after removal of terminal hydroxyl groups from a hydroxyl-terminated polymer having an average molecular weight of from 600 to 2,000 selected from the group consisting of polyesters, polyethers, polyester amides, polyester urethanes, polyether urethanes and polyether esters.

3. Process for producing a polyurethane solution which comprises reacting a bifunctional low polymeric compound of the general formula HO—E—OH where E has the same meaning as in claim 1 with an excessive molar amount of an organic diisocyanate of the general formula OCN—$R_1$—NCO wherein $R_1$ has the same meaning as in claim 1 to form an isocyanate terminated prepolymer and reacting the prepolymer in a solvent selected from the group consisting of N,N-dimethylformamide, N,N-dimethylacetamide, N-methylpyrrolidone, N,N,N',N'-tetramethylurea, hexamethylphosphoramide, tetramethylenesulfone and dimethylsulfoxide, with a diamine of the general formula $H_2N$—$R_2$—$NH_2$ wherein $R_2$ has the same meaning as in claim 1 in the presence of a compound selected from the group consisting of potassium isocyanate, lithium chloride, ammonium rhodanate and calcium nitrate in an amount of less than 10 weight percent of the resulting polyurethane and a compound of the general formula

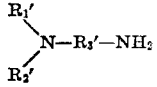

wherein $R_1'$ and $R_2'$ respectively are selected from lower alkyls and $R_3'$ represents an alkylene containing not more than 6 carbon atoms in an amount of less than 8 molar percent of said diamine.

4. Process for producing a polyurethane solution according to claim 3 in which the compound of general formula

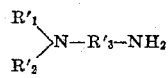

is a member selected from the group consisting of dimethylaminoethylamine, dimethylaminopropylamine, diethylaminoethylamine and diethylaminopropylamine.

References Cited

UNITED STATES PATENTS

| | | | |
|---|---|---|---|
| 3,044,989 | 7/1962 | Shivers | 260—77.5 |
| 3,538,037 | 11/1970 | Matsushita et al. | 260—31.2 |

FOREIGN PATENTS

| | | | |
|---|---|---|---|
| 1,110,868 | 4/1968 | Great Britain | 260—77.5 |

DONALD E. CZAJA, Primary Examiner

R. W. GRIFFIN, Assistant Examiner

U.S. Cl. X.R.

260—30.8 R, 30.8 DS, 32.4, 32.6 N, 75 NB, 75 NC, 77.5 AB, 77.5 AC, 77.5 AN, 77.5 AQ, 77.5 SP

UNITED STATES PATENT OFFICE
CERTIFICATE OF CORRECTION

Patent No. 3,645,976     Dated February 29, 1972

Inventor(s) ISAMU SUZUKI et al

It is certified that error appears in the above-identified patent and that said Letters Patent are hereby corrected as shown below:

Co-Inventor "Kunico Kondo" should read "Kunio Kondo".

Column 2, lines 20-25 - Formula - rewrite first subscript "n" as "m".

Signed and sealed this 17th day of April 1973.

(SEAL)
Attest:

EDWARD M. FLETCHER, JR.
Attesting Officer

ROBERT GOTTSCHALK
Commissioner of Patents